US005581580A

United States Patent [19]
Lindbom et al.

[11] Patent Number: 5,581,580
[45] Date of Patent: Dec. 3, 1996

[54] LOW COMPLEXITY MODEL BASED CHANNEL ESTIMATION ALGORITHM FOR FADING CHANNELS

[75] Inventors: Lars Lindbom, Uppsala; Karim Jamal, Stockholm, both of Sweden

[73] Assignee: Telefonaktiebolaget LM Ericsson, Stockholm, Sweden

[21] Appl. No.: 63,977

[22] Filed: May 20, 1993

[51] Int. Cl.⁶ .................. H03D 1/00; H04L 27/06
[52] U.S. Cl. ............... 375/340; 375/377; 455/52.3
[58] Field of Search ............... 375/94, 100, 11, 375/13, 14, 355, 326, 346, 340, 377; 455/52.3, 65

[56] References Cited

U.S. PATENT DOCUMENTS

| | | | |
|---|---|---|---|
| 5,127,025 | 6/1992 | Okanoue | 375/100 |
| 5,204,878 | 4/1993 | Larsson | 375/94 |
| 5,231,648 | 7/1993 | Driedger et al. | 375/13 |
| 5,303,263 | 4/1994 | Shoji et al. | 375/94 |

FOREIGN PATENT DOCUMENTS

| | | |
|---|---|---|
| 2268377 | 1/1994 | United Kingdom . |
| WO91/10296 | 7/1991 | WIPO . |
| WO91/17607 | 11/1991 | WIPO . |

*Primary Examiner*—Edward L. Coles, Sr.
*Assistant Examiner*—Thomas D. Lee
*Attorney, Agent, or Firm*—Burns, Doane, Swecker & Mathis, L.L.P.

[57] ABSTRACT

A low complexity model based channel estimator is disclosed for use by a receiver in Rayleigh fading environments. The receiver contains at least one channel state estimator which uses an auto regressive model for channel variations. The channel state estimates are initialized by using at least preliminarily detected symbols. The receiver also contains a data detector which uses the received signal and the channel estimate, or a function thereof, delivered by at least one channel estimator to detect the transmitted symbols.

51 Claims, 4 Drawing Sheets

LOW COMPLEXITY MODEL BASED CHANNEL ESTIMATION ALGORITHM FOR FADING CHANNELS

FIELD OF THE INVENTION

The present invention relates to a channel estimator in Rayleigh fading environments and, more particularly, to a low complexity model based channel estimator for fading channels.

In data transmission systems where the characteristics of a transmission channel change appreciably during the transmission of data, it is often necessary to use an adaptive detector at the receiver end. For example, a detector may be needed if the channel, besides being time varying, also is time dispersive. In this case, an equalizer is usually employed as a detector. An equalizer requires knowledge of the channel characteristics which requires that the channel characteristics be tracked if they vary with time. The channel is typically modeled as a complex valued finite impulse response filter (FIR) wherein the characteristics of the channel are taps or coefficients of the filter model. In order to track the channel characteristics during data detection, the equalizer has to operate in what is known as a "decision directed mode". This means that the algorithm that estimates the channel parameters uses detected data symbols as inputs.

One commonly used equalizer is the Adaptive Viterbi Detector often referred to as the Viterbi equalizer. The Viterbi equalizer consists of a Viterbi detector and a channel estimation algorithm. While the Viterbi equalizer has many advantages over other types of equalizers, it has one major disadvantage particularly for rapidly varying channels. This disadvantage is an inherent delay in the detector which means that when "processing" symbol number k, the symbol that is actually outputted, is actually k-D, wherein D represents a decision delay. This is due to the fact that the Viterbi detector is a sequence detector and not a symbol detector. The delay of D symbols leads to a delay in the channel estimation, so that the channel parameters that are used by the Viterbi detector to process symbol number k are in fact D symbols "old". This obviously affects the performance of the detector if the channel varies rapidly. In order to minimize this problem, a predictor can be used to predict the parameters at symbol k from the parameters at symbol k-D. While the use of a predictor will improve the performance, a predictor is sensitive to a low signal to noise ratio.

It is however possible to eliminate the decision delay problem entirely. This was accomplished in Swedish Patent No. 464,902 to Gundmundson entitled "A Method of Adapting a Viterbi Algorithm to a Channel Having Varying Transmission Properties", where a method of joint channel and data estimation is described. Instead of using only one channel estimate, a bank of channel estimates is used. Each of the so-called "survivor" paths of the Viterbi Algorithm is associated with a "survivor" channel estimate. While this method shows some superiority over traditional schemes for medium to high fading rates, even the performance of this method will deteriorate when the fading rate is high enough. The reason for this is that the channel estimation algorithm contains no information about the nature of channel variations.

One way of mitigating this general problem is to use a model based channel estimation. This means that some form of a-priori information of the channel's behavior is built into the channel estimator. The Kalman estimator is a well known model based estimator. The problem with the Kalman estimator is that it has an extremely high computational complexity when the channel input is unknown a-prior information, i.e., when the detector is run in a decision directed mode.

A low complexity model based channel estimator is disclosed in Swedish Patent No. 469,052 entitled "Process to establish a channel estimate for a time varying radio channel". In the Swedish Patent, the channel estimator assumes that the channel varies linearly with time. Both the channel taps themselves and their slope are estimated simultaneously. In this channel estimator a straight line approximation for the channel modelling is used and the adaptation gain settings are set in an ad hoe manner.

When a channel varies rapidly, a model based channel estimation algorithm is necessary. However, most model based estimators are of extremely high complexity, making them impractical for implementation in, for example, a low powered hand-held mobile phone. It is therefore desirable to have a low complexity model based algorithm, i.e., an algorithm that gives the performance of a Kalman type algorithm, but still has the low complexity of a much simpler algorithm like the Least Means Squares algorithm.

SUMMARY OF THE DISCLOSURE

It is an object of the present invention to provide a low complexity algorithm for channel estimation in Rayleigh fading environments. The algorithm is based on simplified internal modeling of time variant channel coefficients in approximation of a Kalman estimator.

In one embodiment of the present invention, the receiver contains at least one channel state estimator which uses an auto regressive model for channel variation. The receiver also contains means for initializing the channel state estimates by using at least one known sequence and using at least preliminarily detected symbols for updating the channel state estimate during data detection. In addition, the receiver contains a data detector which uses the received signal and the channel estimate, or a function thereof, delivered by the channel state estimator to detect the transmitted symbols.

BRIEF DESCRIPTION OF THE DRAWINGS

The present invention will now be described in more detail with reference to preferred embodiments of the invention, given only by way of example, and illustrated in the accompanying drawings, in which.

DETAILED DESCRIPTION OF THE DISCLOSURE

The channel estimator of the present invention uses a model of the channel's expected behavior. A mobile radio channel is typically modeled as a zero mean, complex valued stochastic process known as a Raleigh fading channel. In the present invention, the Raleigh fading channel is modelled as an auto regressive process of a second order.

The state space representation of such a system is formulated and the well known Kalman estimator equations are stated.

The problem with using the Kalman estimator is having to update the matrix P(n), the so-called Riccati equation. A well known technique for avoiding this computationally heavy updating is to compute P(n) in advance and store this sequence in a memory. However, this is not possible if P(n) depends on the transmitted data which is unknown a-priori.

The present invention regards P(n) as a matrix valued stochastic process and each data burst as an independent realization of this process. An approximation of the mean square sequence [E[P[n]]] can then be calculated as described below. In the present invention, the so called Kalman gain which is normally time varying is replaced by a constant gain $L_k$ which results in a low complexity update method. As will be explained below, the constant gain is an analytic function of the model parameters.

Figure 1:
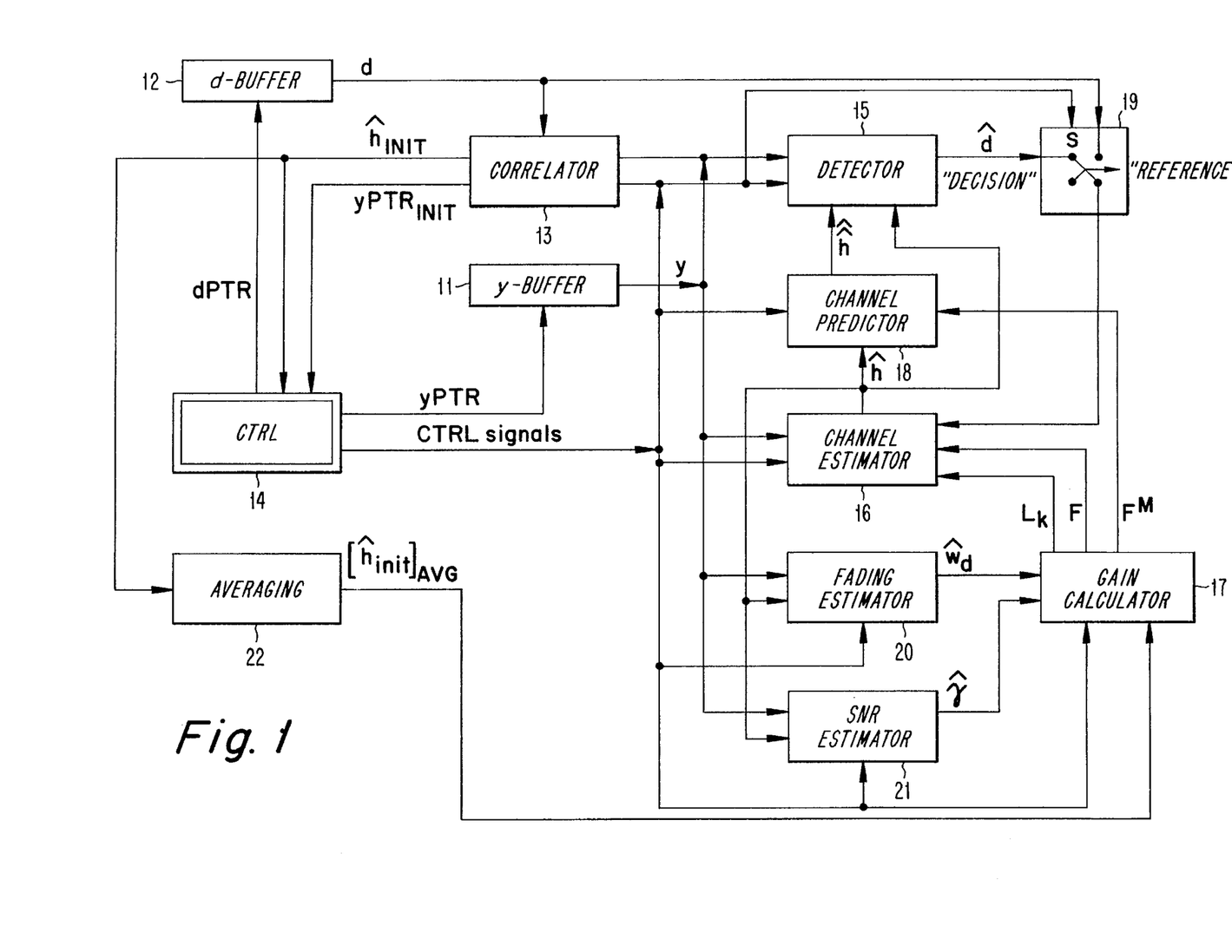
FIG. 1 illustrates an adaptive detector structure according to one embodiment of the present invention.

One embodiment of the present invention will now be described in connection with FIG. 1 which illustrates the structure of an adaptive detector used in connection with burst-wise transmission. A received signal, y, is buffered in a yBUFFER 11. The symbol sequence/sequences known to the receiver, e.g., synchronization sequences, are stored in a dBUFFER 12. Before data detection can begin, a symbol sampling position has to be determined because the received signal in the yBUFFER 11 may be sampled at a higher rate than the symbol rate and because slot-synchronization must be performed. In the present invention, the symbol sampling position is determined by a correlator 13. The correlator 13 correlates the synchronization sequence stored in the dBUFFER 12 with the received signal y stored in the yBUFFER 11. The synchronization position is determined from the correlation by e.g. maximum energy criteria. The synchronization position indicates the correct position in the yBUFFER 11 from which detection should begin. If the synchronization sequence has sufficiently good auto-correlation properties, an estimate of the channel's impulse response (CIR), hereafter denoted as the channel estimate, is produced through the correlation as well. The channel estimate is generally a complex valued vector with (m+1) elements or taps. Alternatively, a general least squares (LS) channel estimation may be performed at the selected synchronization position. As a result, the correlator 13 outputs a start sample $yPTR_{init}$ and an initial channel estimate $\hat{h}_{init}$ which are sent to the control unit 14, $\hat{h}_{init}$ is then passed to the channel estimator.

During data detection of unknown data, e.g., subsequent to the known synchronization sequence, a detector 15 uses the received signal and a channel estimate to produce a detected symbol $\hat{d}d$. A channel estimator 16 then uses the received signal y, a detected symbol $\hat{d}$ plus the m previously detected symbols, and parameters delivered from a gain calculator 17 to produce an updated channel estimate. The estimated received signal $\hat{y}$ is desired by convolving the channel estimate with the m+1 last detected symbols. Then the error signal is formed as y-ŷ. The function of these modules will be described in more detail below. It is important to note that some detectors have an inherent decision delay of M symbols where M≧1. This means that the output symbol ⓓ A at a certain point in time corresponds to the received signal M steps earlier than yPTR. Thus the control unit 14 must compensate yPTR by an appropriate amount.

The output of the channel estimator 16 is an updated channel estimate $\hat{h}$ which is inputted into the detector 15 to be used in the detection of the next symbol. Alternatively, a channel predictor 18 could be used to predict the channel for decision delay compensation. In this case, the detector 15 uses the output $\hat{h}$ from the channel predictor 18. The whole procedure described above is then repeated until the whole data field in question is detected.

If the transmitted (received) signal contains data fields unknown to the receiver which are interleaved with known data fields, i.e., synchronization sequences, identification codes, etc. . . . , the channel estimator 16 can be run in either a decision directed mode or in a training or reference directed mode for the known sequences. A switch 19 couples either detected data (decision directed mode) or known data (reference directed mode) to the channel estimator 16. Obviously, there is no decision delay in the reference directed mode since the reference directed mode does not involve detection. Alternatively, an LS-estimation can be performed at each or some of the known sequences, i.e., the correlator function is used again. LS-estimation is a procedure for generating a Least Squares estimate of a parameter(vector), e.g., a channel response. This may be implemented in many ways such as block-wise or recursively. A way of implementing block-wise LS estimation is to perform cross-correlation of the channel input signal and the received signal. This will give an LS-estimate of the channel's impulse response if and only if the auto-correlation of the input signal is a dirac-function. Otherwise this auto-correlation has to be included in the LS-estimation calculations, and simple cross-correlation will not suffice.

The channel estimator thus works in a similar manner regardless of whether the symbols are being detected or whether training is being performed. The only difference is that in the former case estimated symbols are input into the algorithm, and in the latter case known symbols are input into the algorithm.

The channel estimator 16 uses the following equation $$\hat{X}_k(n+1) = F(n) \cdot \hat{X}_k[n] + L_k[n] \cdot d^*[n-k] \cdot e[n] \qquad \text{eq. 1}$$

$$e[n] = y[n] - \hat{y}[n] = y[n] - d[n]^H \cdot \hat{h}[n] = y[n] - \sum_{k=o}^{m} d^*[n-k] \cdot \hat{h}_k[n]$$

$$\hat{h}_k[n] = H \hat{X}_k[n]$$

where $\hat{X}_k[n] = (\hat{X}^o{}_k[n], \hat{X}^1{}_k[n], \ldots, \hat{X}^n{}_k[n])^T$ is the channel state estimate for tap number #k, F[n] is the channel state transition matrix (N×N) which generally may be time-varying as indicated, $L_k[n]$ is the estimation gain, which may also be time varying ($L_k(n) = (l_{ko}[n], l_k^1[n], \ldots, l_k^n[n])^T$), $d[n] = (d^*[n], d^*[n-1], \ldots, d^*[n-m])^T$ is a vector containing the last (n+1) symbols, $\hat{h}[n] = (\hat{h}_o[n], \hat{h}_1[n], \ldots, \hat{h}_m[n])^T$ is the channel estimate containing m taps, H is a constant matrix, H=Hermitian transpose operation, and k=0 . . . m.

In the preferred embodiment of the present invention, the order of the model is 2 (N=1), however the present invention is not limited thereto.

Figure 2:
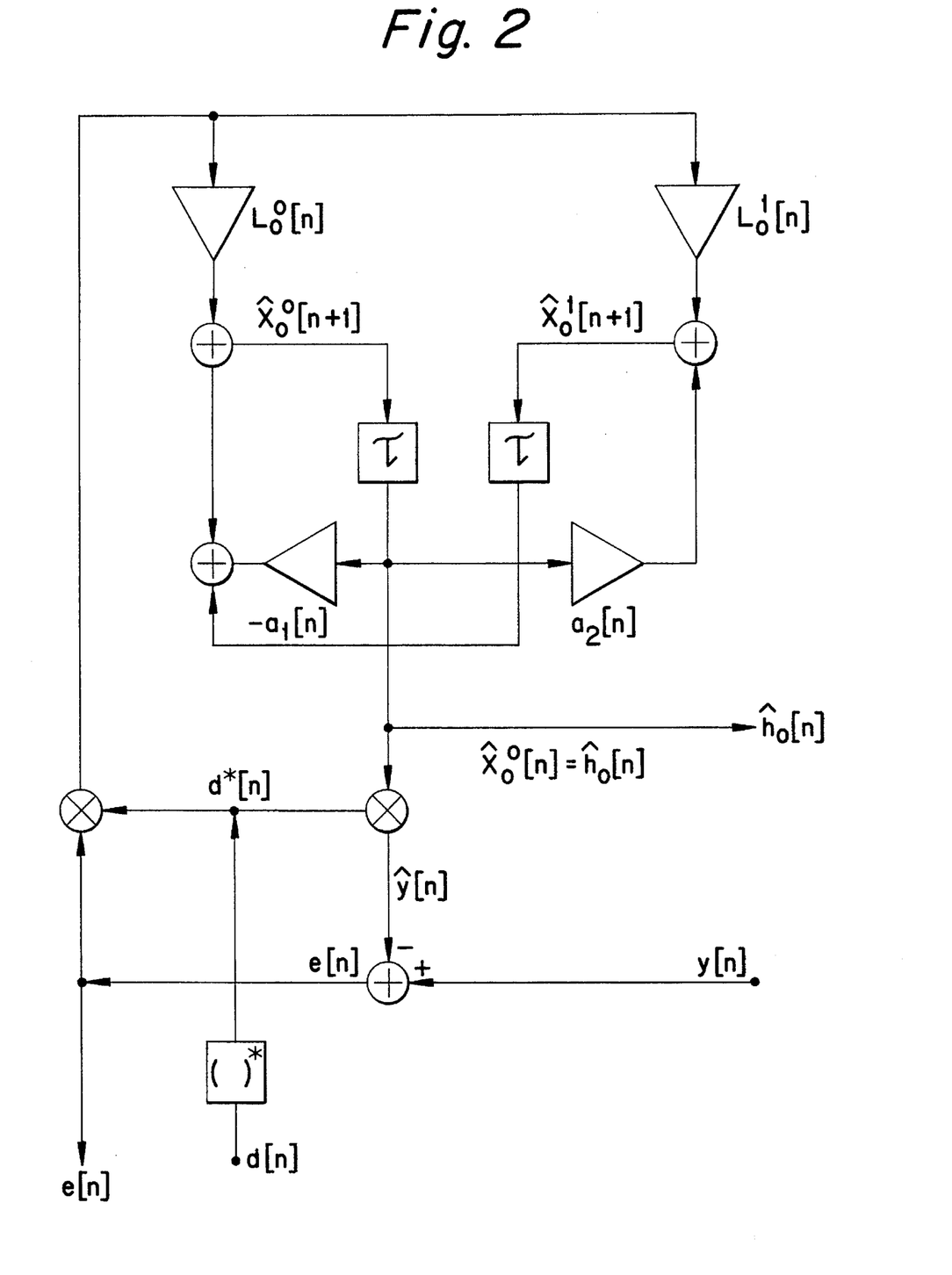
FIG. 2 illustrates a channel estimator according to one embodiment of the present invention.

An implementation of the channel estimator 16 is illustrated in FIG. 2, where m=O has been chosen for simplicity, i.e., a one tap channel.

The inputs to the channel estimator are the received signal y, the data symbols d or $\hat{d}$, and the parameters F and $L_k$, that are used in the algorithm. This allows F and $L_k$, to vary with time. In the preferred embodiments, $$L_k[n] = (l_k^0[n], l_k^1[n])^T \qquad \text{eq. 2}$$

and $$F[n] = \begin{bmatrix} -a_1[n] & 1 \\ -a_2[n] & 0 \end{bmatrix} \qquad \text{eq. 3}$$

The gain $L_k$, is an analytic function of the model parameters. With an auto regressive model, the estimator is controlled by three model parameters, wd, rd, and $\gamma_k$. The parameters $w_d$ and $r_d$ are used to set the placement of the poles of the model. The value of $w_d$ represents the true doppler spread of the channel, and thus it may be set from a doppler spread estimator. The parameter $\gamma_k$ is a reliability factor which is well known from Kalman filter theory. A large $\gamma_k$ instructs the channel estimator to trust the measurements more than the model and a small value for gamma tells the channel estimator to rely more on the model than on the received measurements. It is possible to use different values of gamma for different taps of the channel estimate.

The gains $L_k$ can be pre-computed from the solutions to the Riccati equation (using common Kalman notation):

$$P_{kk} = F \left[ P_{kk} - \frac{P_{kk} H^T H P_{kk}}{1 + H P_{kk} H^T} \right] F^T + \gamma_k G G^T \qquad \text{eq. 4}$$

$$L_k = \frac{F P_{kk} H^T}{\sigma_d^2 (1 + H P_{kk} H^T)} \quad P_{kk} \triangleq \frac{\bar{P}_{kk}}{e_k} \quad \gamma_K \triangleq \frac{\sigma_{e_k}^2}{e_k} \qquad \text{eq. 5}$$

Here, $\gamma_k$ can be used to tune the gain to a specific signal-to-noise ratio. In addition, $\gamma_k$ can be changed for each burst or it can be kept constant over several bursts. The tuning of $\gamma_k$ can also be used to account for possible nonstationary behavior of $R_e$, which is a diagonal matrix containing the noise, or model error variance for each element of the state vector.

The recursions are asymptotically stable for all choices of $\gamma_k \geq 0$. Note that this modelling approach provides extrapolation in time, i.e., prediction, $\hat{X}_k(n+p) = F^p \hat{X}_k(n) p = 0, 1, 2, \ldots$ Since both $L_k^i$ and $a_i$ are functions of the actual doppler spread, $w_d$ and the actual signal to noise ratio $\hat{\gamma}_k$, they may be made functions of the estimates of those quantities $\hat{w}d$ and $\hat{\gamma}_k$. The signal to noise ratio may be estimated by averaging the squared error signal e that is generated in the channel estimator 16 and then taking the reciprocal of the average. The signal will be inversely proportional to the noise level of the channel. This signal may then be multiplied by a quantity proportional to the signal level in order to give a better signal to noise ratio estimate $\hat{\gamma}$. As illustrated in FIG. 1, the SNR estimator 21 generates $\hat{\gamma}$ in a known manner.

If the channel estimator uses more than one channel tap (m>0), it is also possible to have different adaptation gains for different taps. In U.S. application Ser. No. 620,710, entitled "A Method of Effecting Channel Estimation for a Fading Channel When Transmitting Symbol Sequences", a system where taps that are smaller on average are given lower adaptation gains is disclosed. As a result, the adaptive detector performs better for fast fading channels. A similar method is used in the present invention and is illustrated in FIG. 1 by the averaging unit 22. The averaging unit 22 averages the initial channel estimate energy in order to use this information in the calculation of the adaptation gains $L_k$. The averaging can be done with an update rate of e.g. once each burst, assuming burst-wise transmission.

A channel predictor improves the performance even further. An m-step prediction is easily accomplished by taking the so-called transition matrix F of the state space representation and raising it to the power of m, and multiplying this resultant matrix with the current channel state estimate.

The channel predictor is readily achieved by $$\hat{X}_k[n+m] = F^m[n] \hat{X}_k[n] \qquad \text{eq. 6}$$

$$F^m[n] \triangleq \begin{bmatrix} f_{11}^{(m)}[n] & f_{12}^{(m)}[n] \\ f_{21}^{(m)}[n] & f_{22}^{(m)}[n] \end{bmatrix} = \begin{bmatrix} -a_1[n] & 1 \\ -a_2[n] & 0 \end{bmatrix}^m \qquad \text{eq. 7}$$

Figure 3:
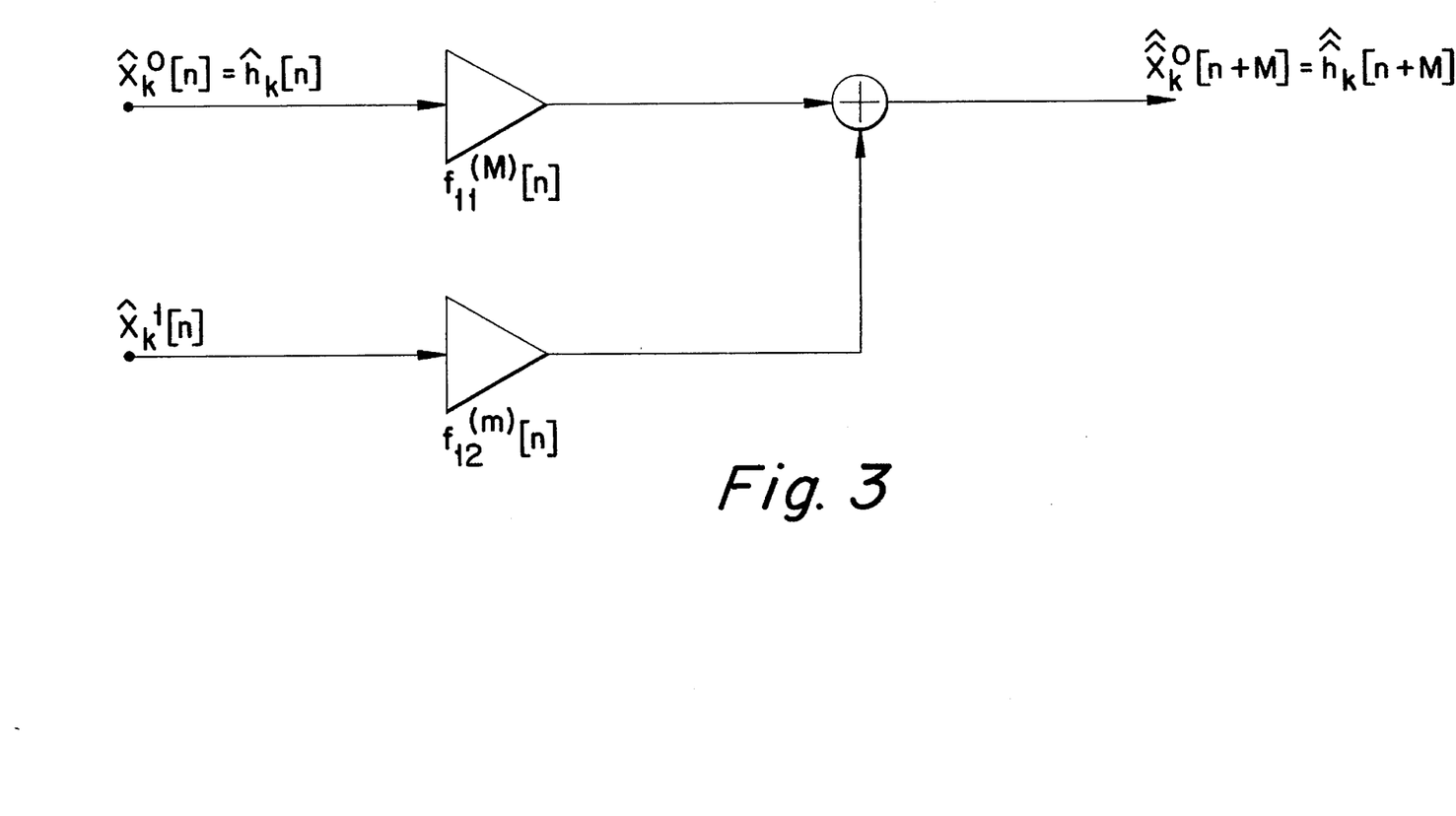
FIG. 3 illustrates a channel predictor according to one embodiment of the present invention.

Thus an implementation can be illustrated in FIG. 3 where a one tap channel is assumed. In this example, only $\hat{X}_k^0$ is extrapolated since this state estimate corresponds to the actual channel tap estimate $\hat{h}_k$. Since F[n] can be time varying, $F[n]^m$ may also be time varying, where m is a variable. The gain calculator delivers the $F^m[n]$ to the channel predictor. The parameters used in the channel estimator may of course be set to fixed values.

With second order models {F,G,H}, simple analytical expressions for the gains $L_k$ exist. Two second order models, the lightly damped AR(2) model and the integrated random walk model, are discussed below.

In Rayleigh fading environments, the channel coefficients behave as narrow band noises with a spectral peak. The simplest models, which describes such oscillatory behavior, are lightly damped second order AR models with real-valued coefficients $$h_k(n) = \frac{1}{1 + a_1 q^{-1} + a_2 q^{-2}} e_k(n) \qquad \text{eq. 8}$$

$$a_1 = -2r_d \cos(w_d) \quad a_2 = r_d^2$$

In this example, the pole locations are $r_d e^{\pm jw_d}$. The pole radius ($r_d$) reflects the damping and $w_d$ is the dominating frequency of the coefficient variation and $w_d \sim 2\pi f_m / f_z$. If $f_m$ is unknown, the spectral peak should be well damped, to obtain a robust model.

The model can be represented in an observable canoxical state-space form by the following matrices $$F = \begin{pmatrix} -a_1 & 1 \\ -a_2 & 0 \end{pmatrix} \quad G = \begin{pmatrix} 1 \\ 0 \end{pmatrix} \quad H = (1 \ 0)$$

Analytic expressions of the gains $L_k$ can be given by $$L_k = \frac{F P_{kk} H^T}{\sigma_d^2 (1 + p_{1,1})} \begin{pmatrix} -a_1 p_{1,1} + p_{1,2} \\ -a_2 p_{1,1} \end{pmatrix} \qquad \text{eq. 9}$$

where $P_{1,1}$ and $P_{1,2}$ are elements of $P_{kk}$, given by $$\alpha_0 \triangleq 1 + a_1^2 + a_2^2 + \gamma_k \qquad \text{eq. 10}$$

$$\zeta \triangleq \frac{\alpha_0 - 2a_2 + \sqrt{(\alpha_0 + 2a_2)^2 - 4a_1^2(1 + a_2)^2}}{2}$$

$$p_{1,1} = \frac{\zeta + \sqrt{\zeta^2 - 4a_2^2}}{2} - 1$$

$$p_{1,2} = \frac{a_1 a_2}{1 + a_2 + p_{1,1}} p_{1,1}$$

Figure 4:
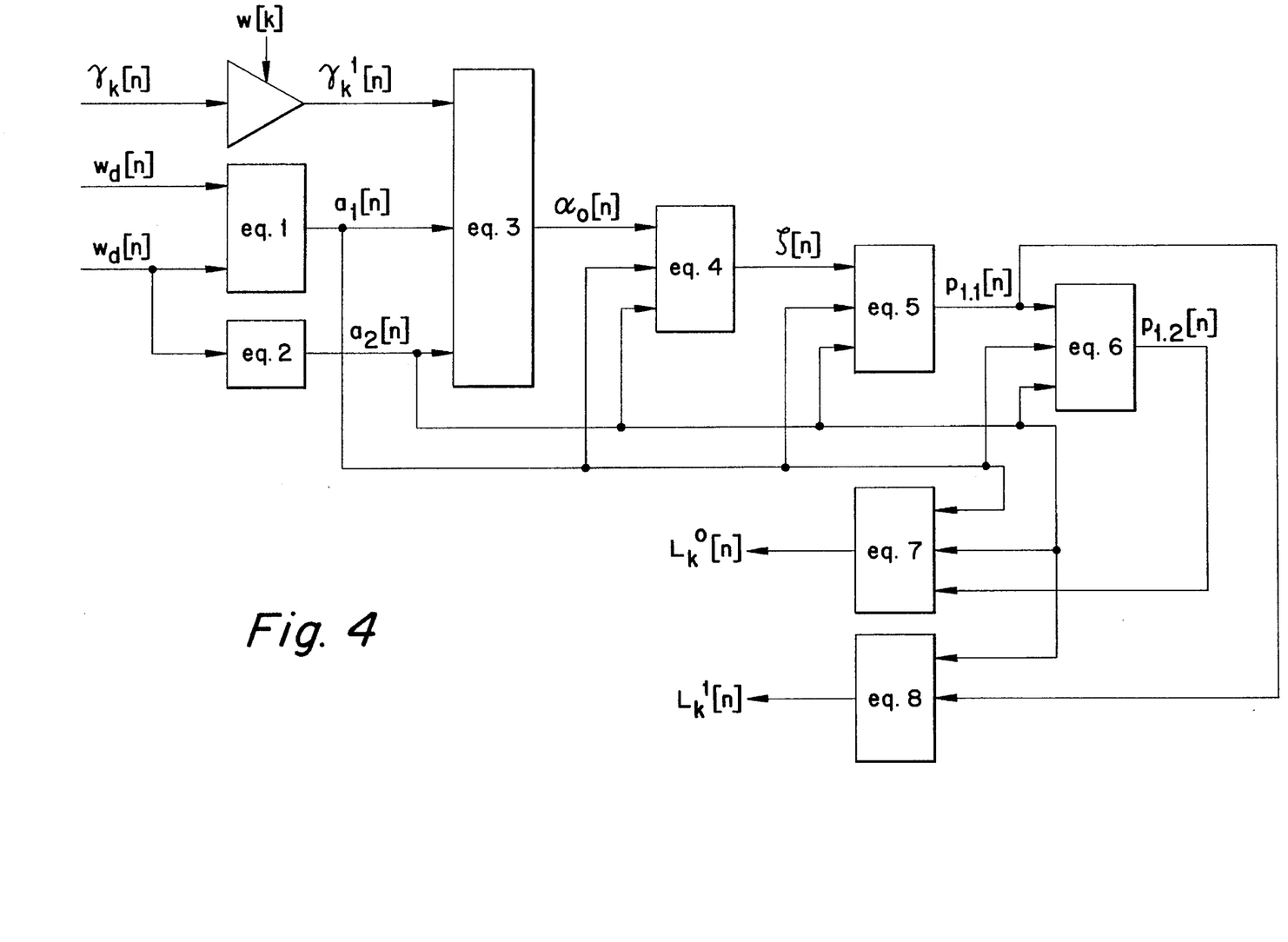
FIG. 4 illustrates a gain calculator according to one embodiment of the present invention.

The expressions for $P_{1,1}$ and $P_{1,2}$ are derived from equation 3 illustrated above. The generation of the parameters $a_1$, $a_2$, and $L_k$ for this model is illustrated in FIG. 4 and the equations listed below:

$$a_1[n] = -2r_d[n] \cdot \cos(w_d[n]) \qquad \text{eq. 11}$$

-continued $$a_2[n] = r_d[n]^2 \qquad \text{eq. 12}$$

$$\alpha_0[n] = 1 + a_1[n]^2 + a_n[n]^2 + \gamma_k^1[n] \qquad \text{eq. 13}$$

$$\zeta[n] = \frac{1}{2}\left(\alpha_0[n] - 2a_2[n] + \sqrt{(\alpha_0[n] + 2a[n])^2 - 4a_1[n]^2(1+a_2[n])^2}\right) \qquad \text{eq. 14}$$

$$P_{1,1}[n] = \frac{1}{2}\left(\zeta[n] + \sqrt{\zeta[n]^2 - 4a_2[n]^2}\right) - 1 \qquad \text{eq. 15}$$

$$P_{1,2}[n] = a_1[n]a_2[n] \cdot P_{1,1}[n]/(1 + a_2[n] + p_{1,1}[n]) \qquad \text{eq. 16}$$

$$L_k^0[n] = (-a_1[n] \cdot P_{1,1}[n] + P_{1,2}[n])/\sigma_d^2(1 + p_{1,1}[n]) \qquad \text{eq. 17}$$

$$L_k^1[n] = -a_2[n]P_{1,1}[n]/\sigma_d^2(1 + P_{1,1}[n]) \qquad \text{eq. 18}$$

In FIG. 4, a weighting factor w(k) is introduced. However, if preweighting is not desired, the weighting factor can be set to 1. In equation 17, a quantity denoted $\sigma_d^2$ is introduced. This quantity represents the variance of the transmitted symbols and is thus a modulation dependent constant. As a result, all of the necessary parameters needed by the channel estimator are generated by the gain calculator as is illustrated in FIG. 4. The generation of parameters may be performed only once or once every received data burst, or at any desired rate. In addition, different parameters may have different updating rates.

In fading environments, the channel coefficients exhibit typical trend behavior, i.e., they continue in some direction for a period of time. A simple way to incorporate such behavior is to mode the coefficients as integrated random walks where $$h_k(n) = h_k(n-1) + \frac{1}{1 - q^{-1}} e_k(n) \qquad \text{eq. 19}$$

This model can be represented in a state-space form by the following matrices $$F = \begin{pmatrix} 1 & 1 \\ 0 & 1 \end{pmatrix} \quad G = \begin{pmatrix} 0 \\ 1 \end{pmatrix} \quad H = (1 \ 0)$$

corresponding to the following choice of state vectors $$X_K^T(n) = (X_k^{(1)}(n) X_k^{(2)}(n)) = (h_k(n) \ h_k(n+1) - h_k(n)). \qquad \text{eq. 20}$$

Analytic expressions of the gains $L_k$ are then given by $$L_k = \frac{FP_{kk}H^T}{\sigma_d^2(1 + p_{1,1})} = \frac{1}{\sigma_d^2(1 + p_{1,1})} \begin{pmatrix} p_{1,1} + p_{1,2} \\ p_{1,2} \end{pmatrix} \qquad \text{eq. 21}$$

where $P_{1,1}$ and $P_{1,2}$ are elements of $P_{kk}$, given by $$\zeta \triangleq \frac{4 + \gamma_k + \sqrt{\gamma_k(16 + \gamma_k)}}{2} \qquad \text{eq. 22}$$

$$p_{1,1} = \frac{\zeta + \sqrt{\zeta^2 - 4}}{2} - 1 \quad p_{1,2} = \sqrt{\gamma_k(1 + p_{1,1})}$$

The $X_k(n)$ is formally assumed to be a nonstationary process when defining the "nomical model". However, the actual estimates $\hat{X}_k(n)$ will be stationary, since stationary data is assumed. As can be seen from eq. 20, the forward difference approximations of the derivative of $h_k$ is via $\hat{X}_k^{(2)}(n)$.

While a particular embodiment of the present invention has been described and illustrated, it should be understood that the invention is not limited thereto since modifications may be made by persons skilled in the art. The present application contemplates any and all modifications that fall within the spirit and scope of the underlying invention described and claimed herein.

We claim:

1. A receiver, comprising:
   a channel estimator using a state space model for modelling a time varying channel, said state space model being defined by a channel state vector, a transition matrix and model parameters, said channel estimator using said transistor matrix and an adaption gain vector to update a channel state vector estimate;
   a gain calculator using said model parameters to determine said transition matrix and said adaption gain vector; and
   at least one model parameter unit for assigning values to said model parameters, wherein said at least one model parameter unit outputs values of said model parameters to said gain calculator where upon said gain calculator outputs said transition matrix and said adaption gain vector to said channel estimator where upon said channel estimator updates said channel state vector estimate.

2. A receiver according to claim 1, wherein at least one of said model parameters is set according to predetermined values.

3. A receiver according to claim 1, wherein at least one of said model parameters represent physical entities.

4. A receiver according to claim 3, wherein at least one of said model parameters is assigned values based on measurements of said physical entities.

5. A receiver according to claim 4, wherein at least one of said model parameters is assigned values only once.

6. A receiver according to claim 4, wherein at least one of said model parameters is updated periodically at a predetermined rate.

7. A receiver according to claim 6, wherein at least one of said model parameters is updated each symbol time.

8. A receiver according to claim 6, wherein at least one of said model parameters is updated once every received data burst.

9. A receiver according to claim 6, wherein different ones of said model parameters are updated at different updating rates.

10. A receiver according to claim 4, further comprising:
    a doppler spread estimator for estimating the doppler spread of the channel as one of said physical entities.

11. A receiver according to claim 4, further comprising:
    a signal-to-noise ratio estimator for estimating the signal-to-noise ratio as one of said physical entities.

12. A receiver according to claim 1, further comprising:
    a data detector using a function of said channel state vector estimate to detect symbols that are received over said channel.

13. A receiver according to claim 12, further comprising:
    a channel predictor for generating a predicted channel state vector estimate which is valid at a time (n+m) using said transition matrix which is valid at a time n and a current channel state vector estimate.

14. A receiver according to claim 13, wherein said predicted channel state vector estimate is generated by raising said transition matrix to the power of m and multiplying this resultant matrix with said current channel state vector estimate.

15. A receiver according to claim 1, further comprising:
    a switching means for coupling either detected data or known data to said channel estimator.

16. A receiver according to claim 1, wherein updating is performed according to $$\hat{X}_k(n+1) = F(n) \cdot \hat{X}_k[n] + L_k[n] \cdot d^*[n-k] \cdot e[n]$$

$$e[n] = y[n] - \hat{y}[n] = y[n] - d[n]^H \cdot \hat{h}[n] = y[n] - \sum_{k=o}^{m} d^*[n-k] \cdot \hat{h}_k[n]$$

$$\hat{h}_k[n] = H \hat{X}_k[n].$$

17. A receiver according to claim 1, further comprising:
an averaging means for averaging the energy of a function of the channel state vector estimate which is used in the determination of at least said adaption gain vector.

18. A receiver according to claim 1, wherein one of said model parameters reflects the damping of the channel coefficient variation.

19. A method of estimating a time-varying channel, comprising the steps of:
modelling the channel by a state space model defined by a channel state vector, a transition matrix and model parameters;
expressing said transition matrix and an adaption gain vector as explicit functions of said model parameters;
assigning values to said model parameters;
determining said transition matrix and said adaption gain vector using the result of said assigning step; and
updating a channel state vector estimate using the result of said step of determining.

20. A method according to claim 19, wherein in said updating step said channel state vector estimate is expressed as the sum of a model dependent term and a measurement dependent term.

21. A method according to claim 20, wherein said model dependent term is expressed as a product of said transition matrix and said channel state vector estimate.

22. A method according to claim 20, wherein said measurement dependent term is expressed as a product of said adaption gain vector and a correction term.

23. A method according to claim 19, wherein said updating is performed according to:

$$\hat{X}_k(n+1) = F(n) \cdot \hat{X}_k[n] + L_k[n] \cdot d^*[n-k] \cdot e[n]$$

$$e[n] = y[n] - \hat{y}[n] = y[n] - d[n]^H \cdot \hat{h}[n] = y[n] - \sum_{k=o}^{m} d^*[n-k] \cdot \hat{h}_k[n]$$

$$\hat{h}_k[n] = H \hat{X}_k[n].$$

24. A method according to claim 19, wherein at least one of the model parameters are set according to predetermined values.

25. A method according to claim 19, wherein at least one of said model parameters represent physical entities.

26. A method according to claim 25, wherein said at least one of said model parameters are assigned values based on measurements of said physical entities.

27. A method according to claim 26, wherein one of said physical entities is the doppler spread of the channel.

28. A method according to claim 26, wherein one of said physical entities is the signal-to-noise ratio.

29. A method according to claim 26, wherein said model parameters are assigned values only once.

30. A method according to claim 26, further comprising the step of:
updating said model parameters at a predetermined rate.

31. A method according to claim 30, wherein said model parameters are updated each symbol time.

32. A method according to claim 30, wherein said model parameters are updated once every received data burst.

33. A method according to claim 30, wherein different ones of said model parameters are updated at different updating rates.

34. A method according to claim 19, wherein one of said model parameters reflects the damping of the channel coefficient variation vector.

35. A method according to claim 19, further comprising the step of:
generating a predicted channel state vector estimate valid at a time n+m using said transition matrix valid at a time n and a current channel state vector estimate.

36. A method according to claim 35, wherein said predicted channel sate vector estimate is generated by raising said transition matrix to the power of m and multiplying this resultant matrix with said current channel state vector estimate.

37. A method according to claim 35, further comprising the steps of:
transmitting signals containing symbols over said channel;
detecting said symbols using a function of said predicted channel state vector estimate.

38. A method according to claim 19, further comprising the steps of:
transmitting signals containing symbols over said channel;
detecting said symbols using a function of said channel state vector estimate.

39. A method according to claim 19, further comprising the step of:
averaging the energy of a function of the channel state vector estimate; and
using the averaged energy at said step of determining said adaption gain vector.

40. A method according to claim 19, said step of expressing further comprising the step of:
treating a Riccati equation as a matrix valued stochastic process and each data burst transmitted over said channel as an independent realization of said process.

41. A receiver, comprising:
means for modelling a time varying channel using a state space model, said state space model being defined by a channel state vector, a transition matrix and model parameters, said means using said transition matrix and an adaption gain vector to updated a channel state vector estimate;
means for determining said transition matrix and said adaption gain vector; and
means for assigning values to said model parameters, wherein said assigning means output values of said model parameters to said determining means where upon said determining means outputs said transition matrix and said adaption gain vector to said modelling means where upon said modelling means updates said channel state vector estimate.

42. A receiver according to claim 41, further comprising:
a data detector using a function of said channel state vector estimate to detect symbols that are received over said channel.

43. A receiver according to claim 42, further comprising:
a channel predictor for generating a predicted channel state vector estimate which is valid at a time (n+m) using said transition matrix which is valid at a time n and a current channel state vector estimate.

44. A receiver according to claim 43, wherein said predicted channel state vector estimate is generated by raising said transition matrix to the power of m and multiplying this resultant matrix with said current channel state vector estimate.

45. A receiver according to claim 41, further comprising:
a switching means for coupling either detected data or known data to said channel estimator.

46. A receiver according to claim 41, wherein updating is performed according to $$\hat{X}_k(n+1) = F(n) \cdot \hat{X}_k[n] + L_k[n] \cdot d^*[n-k] \cdot e[n]$$

$$e[n] = y[n] - \hat{y}[n] = y[n] - d[n]^H \cdot \hat{h}[n] = y[n] - \sum_{k=o}^{m} d^*[n-k] \cdot \hat{h}_k[n]$$

$$\hat{h}_k[n] = H \hat{X}_k[n].$$

47. A receiver according to claim 41, further comprising:
an averaging means for averaging the energy of a function of the channel state vector estimate which is used in the determination of at least said adaption gain vector.

48. A receiver according to claim 41, wherein at least one of said model parameters represent physical entities.

49. A receiver according to claim 48, wherein at least one of said model parameters is assigned values based on measurements of said physical entities.

50. A receiver according to claim 49, further comprising:
a doppler spread estimator for estimating the doppler spread of the channel as one of said physical entities.

51. A receiver according to claim 49, further comprising:
a signal-to-noise ratio estimator for estimating the signal-to-noise ratio as one of said physical entities.

* * * * *